United States Patent
Ouyang et al.

(10) Patent No.: US 9,904,010 B2
(45) Date of Patent: Feb. 27, 2018

(54) POLARIZATION INDEPENDENT OPTICAL SWITCH WITH HIGH EXTINCTION RATIO BASED ON SLAB PHOTONIC CRYSTALS

(71) Applicant: Zhengbiao Ouyang, Shenzhen (CN)

(72) Inventors: Zhengbiao Ouyang, Shenzhen (CN); Guohua Wen, Shenzhen (CN)

(73) Assignee: ZHENGBIAO OUYANG, Shenzhen, Guangdong Province (CN)

( * ) Notice: Subject to any disclaimer, the term of this patent is extended or adjusted under 35 U.S.C. 154(b) by 0 days.

(21) Appl. No.: 15/626,161

(22) Filed: Jun. 18, 2017

(65) Prior Publication Data

US 2017/0293078 A1    Oct. 12, 2017

Related U.S. Application Data

(63) Continuation of application No. PCT/CN2015/097056, filed on Dec. 10, 2015.

(30) Foreign Application Priority Data

Dec. 10, 2014 (CN) .......................... 2014 1 0759329

(51) Int. Cl.
   *G02F 1/295* (2006.01)
   *G02B 6/122* (2006.01)
   *G02F 1/313* (2006.01)

(52) U.S. Cl.
   CPC .......... *G02B 6/1225* (2013.01); *G02F 1/313* (2013.01); *G02F 2201/06* (2013.01); *G02F 2202/32* (2013.01); *G02F 2203/06* (2013.01)

(58) Field of Classification Search
   CPC ........ G02B 5/1861; G02B 2006/12147; G02B 6/42; G02B 6/12004; G02B 6/1225
   See application file for complete search history.

(56) References Cited

U.S. PATENT DOCUMENTS 8,571,373 B2   10/2013  Wang et al.
2004/0125266 A1*  7/2004  Miyauchi .......... B01L 3/502746
                                                                  349/57

FOREIGN PATENT DOCUMENTS

CN    101571657 A    11/2009
CN    104375267 A     2/2015
(Continued)

OTHER PUBLICATIONS

Ming-Chang M. Lee, Dooyoung Hah, Erwin K Lau, Hiroshi Toshiyoshi and Ming Wu, "MEMS—Actuated Photonic Crystal Switches", IEEE Photonics Technology Letters, Jan. 15, 2006, pp. 358-360, vol. 18, No. 2.

*Primary Examiner* — Sung Pak
*Assistant Examiner* — Hoang Tran
(74) *Attorney, Agent, or Firm* — Cheng-Ju Chiang

(57) ABSTRACT

The present invention discloses a PIOS with a high extinction ratio based on slab PhCs which comprises an upper slab PhC and a lower slab PhC connected as a whole; the upper slab PhC is a first square-lattice slab PhC, the unit cell of the first square-lattice slab PhC includes a high-refractive-index rotating square pillar, a single first flat dielectric pillar and a background dielectric; the first flat dielectric pillar includes a high-refractive-index dielectric pipe and a low-refractive-index dielectric, or a high-refractive-index flat films, or a low-refractive-index dielectric; the lower slab PhC is a second square-lattice slab PhC with a complete bandgap, the unit cell of said second square-lattice slab PhC includes a high-refractive-index rotating square pillar, a single second flat dielectric pillar and a background dielectric is a low-refractive-index dielectric; and an normalized frequency of the optical switch is 0.41 to 0.4167.

10 Claims, 11 Drawing Sheets

(56) References Cited

FOREIGN PATENT DOCUMENTS

| | | |
|---|---|---|
| CN | 104459988 A | 3/2015 |
| CN | 104459989 A | 3/2015 |
| CN | 104459990 A | 3/2015 |
| CN | 104459991 A | 3/2015 |
| WO | 03/014010 A1 | 2/2003 |
| WO | 2016/091196 A1 | 6/2016 |

* cited by examiner

POLARIZATION INDEPENDENT OPTICAL SWITCH WITH HIGH EXTINCTION RATIO BASED ON SLAB PHOTONIC CRYSTALS

This application claims priority to Chinese Application No. 201410759329.6 filed on Dec. 10, 2014 and is a continuation application of International Application No. PCT/CN2015/097056, filed on Dec. 10, 2015 and published in Chinese as International Publication No. WO2016/091196 on Jun. 16, 2016, the entire contents of which are hereby incorporated by reference.

FIELD OF THE INVENTION

The present invention relates to a polarization-independent optical switch (PIOS) with a high extinction ratio, and particularly to a broadband PIOS with a high extinction ratio (EXR) based on slab photonic crystals (PhCs) with absolute bandgaps.

BACKGROUND OF THE INVENTION

In recent years, with the advent of information age, the speed and amount of information required for communication technology increase dramatically. Optical communication technologies add wings to the information age, but the information processing of nodes and routes still need electronic circuits at present, which restricts the development of communication technologies in terms of speed, capacity and power consumption. Adopting photonic integrated circuits to replace or partially replace electronic integrated circuits for communication routes certainly will become the future direction of development.

A PhC is a structure material in which dielectric materials are arranged periodically in space, and is usually an artificial crystal consisting of two or more materials having different dielectric constants.

The electromagnetic modes in an absolute photonic bandgap (PBG) cannot exist completely, so as an electronic energy band is overlapped with the absolute PBG of PhCs, spontaneous radiation is suppressed. The PhC having the absolute bandgap can control spontaneous radiation, thereby changing the interaction between the fields and materials and further improving the performance of optical devices.

Tunable PBGs can be applied to information communication, display and storage. For modulating at high speeds by using external driving sources, many solutions have been proposed, e.g., controlling magnetic permeability by using a ferromagnetic material, and changing dielectric constant by using a ferroelectric material.

Most of the existing optical switches are realized by using a nonlinear effect, which requires the use of high-power light for control, thus it will inevitably consume a large amount of energy. In the presence of large-scale integrated system and a large number of communication users, the consumption of energy will become enormous. At the same time, the degree of polarization will affect signal-to-noise ratio and transmission speed.

SUMMARY OF THE INVENTION

The present invention is aimed at overcoming the defects of the prior art and providing an optical switch facilitating integration and having polarization-independent property with a high EXR based on slab PhCs.

The technical proposal adopted by the invention to solve the technical problem is as follows:

A PIOS with a high a EXR based on slab PhCs in the present invention comprises an upper slab PhC and a lower slab PhC connected as a whole; the upper slab PhC is a first square-lattice slab PhC, the unit cell of the first square-lattice slab PhC includes a high-refractive-index rotating-square pillar, a single first flat dielectric pillar and a background dielectric; the first flat dielectric pillar is arranged horizontally, the first flat dielectric pillar enables an overall upper slab PhC to form as a whole, and the first flat dielectric pillar includes a high-refractive-index dielectric pipe and a low-refractive-index dielectric, or a high-refractive-index flat films, or a low-refractive-index dielectric; the lower slab PhC is a second square-lattice slab PhC with a complete bandgap, the unit cell of the second square-lattice slab PhC includes a high-refractive-index rotating-square pillar, a single second flat dielectric pillar and a background dielectric, the second flat dielectric pillar is arranged horizontally, the second flat dielectric pillar enables an overall lower slab PhC to form as a whole, and the second flat dielectric pillar is a high-refractive-index dielectric pillar; said background dielectric is a low-refractive-index dielectric; and an normalized frequency of the PIOS is 0.41 to 0.4167.

The thickness of the pipe wall in the first dielectric pillar in the unit cell of the first square-lattice slab PhC is 0-0.004a, where a is the lattice constant of the PhC; and the width of the low-refractive-index dielectric in the pipe is the difference between the width of the first flat dielectric pillar and the thickness of the pipe.

The first and second flat dielectric pillars of said first and second square-lattice slab PhCs are respectively spaced 0.2a of in the centers of the rotating-square pillars.

The side lengths of the high-refractive-index rotating-square pillars of the first and second square-lattice slab PhCs are respectively 0.545a to 0.554a, and their rotating angles are 22.3° to 23° and 67° to 67.6°; and the widths of the first and second slab dielectric pillars in the first and second square-lattice slab PhCs are respectively 0.076a to 0.079a.

The high-refractive-index dielectric is silicon, gallium arsenide, titanium dioxide or a different dielectric having a refractive index of more than 2.

The low-refractive-index dielectric is vacuum, air, cryolite, silica, organic foam, olive oil or a different dielectric having a refractive index of less than 1.5.

The PIOS has one state that the first square-lattice slab PhC is located in an optical channel (OCH) and the second square-lattice slab PhC is located outside an OCH, and another state that the second square-lattice slab PhC is located in the OCH and the first square-lattice slab PhC is located outside the OCH.

The state that said first square-lattice slab PhC is located in the OCH and the second square-lattice slab PhC is located outside the OCH is the optically connected state; the state, wherein the second square-lattice slab PhC is located in the OCH and the first square-lattice slab PhC is located outside the OCH is the optically disconnected state.

The normalized operating frequency range of said PIOS is 0.41 to 0.4167, a TE polarization EXR is −21 dB to −31 dB, and a TM polarization EXR is −41 dB to −50 dB.

Positions of the first and the second square-lattice slab PhCs in the OCHs are adjusted by external forces, including mechanical, electrical and magnetic forces.

Compared with the prior art, the present invention has the following positive effects.

1. The optical switch is an indispensable component in an integrated OCH and is very important for high-speed operation of a network, and large bandwidth, low energy loss, high polarization degree and a high EXR are important parameters for evaluating switches.

2. The functions of the optical switch are realized by adjusting the positions of the first square-lattice slab PhC (the upper slab PhC) and the second square-lattice slab PhC (the lower slab PhC) in the OCH.

3. The structure of the present invention enables a PIOS with a high EXR.

4. The PIOS with a high EXR based on slab PhCs facilitates integration.

These and other objects and advantages of the present invention will become readily apparent to those skilled in the art upon reading the following detailed description and claims and by referring to the accompanying drawings.

BRIEF DESCRIPTION OF THE DRAWINGS

FIG. 1 (b) is a structural schematic diagram of a unit cell of a lower square-lattice slab PhC of the PIOS of the present invention.

FIG. 2 (b) is a structural schematic diagram of a second implementation of the PIOS of the present invention.

FIG. 2 (c) is a structural schematic diagram of a third implementation of the PIOS of the present invention.

FIG. 5 (b) is a TM field distribution diagram in the PIOS for the normalized frequency of 0.41 as shown in embodiment 2.

FIG. 6(b) is a TM field distribution diagram in the PIOS for the normalized operating frequency of 0.4117 as shown in embodiment 3.

FIG. 7 (b) is a TM field distribution diagram in the PIOS for the normalized operating frequency of 0.4121 as shown in embodiment 4.

FIG. 8 (b) is a TM field distribution diagram in the PIOS for the normalized operating frequency of 0.4127 as shown in embodiment 5.

FIG. 9 (b) is a TM field distribution diagram in the PIOS for the normalized operating frequency of 0.413 as shown in embodiment 6.

FIG. 10 (b) is a TM field distribution diagram in the PIOS for the normalized operating frequency of 0.4142 as shown in embodiment 7.

FIG. 11 (b) is a TM field distribution diagram in the PIOS for the normalized operating frequency of 0.4167 as shown in embodiment 8.

The present invention is more specifically described in the following paragraphs by reference to the drawings attached only by way of example.

DESCRIPTION OF THE PREFERRED EMBODIMENTS

The terms a or an, as used herein, are defined as one or more than one, The term plurality, as used herein, is defined as two or more than two. The term another, as used herein, is defined as at least a second or more.

The present invention will be further described in detail below in combination with the accompanying drawings and specific embodiments.

Figure 1:
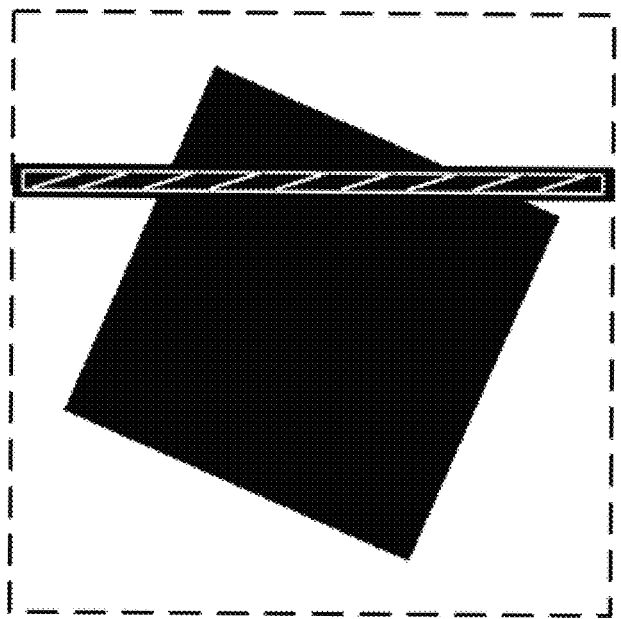
FIG. 1 (a) is a structural schematic diagram of a unit cell of an upper square-lattice slab PhC of the PIOS of the present invention.
Figure 1:
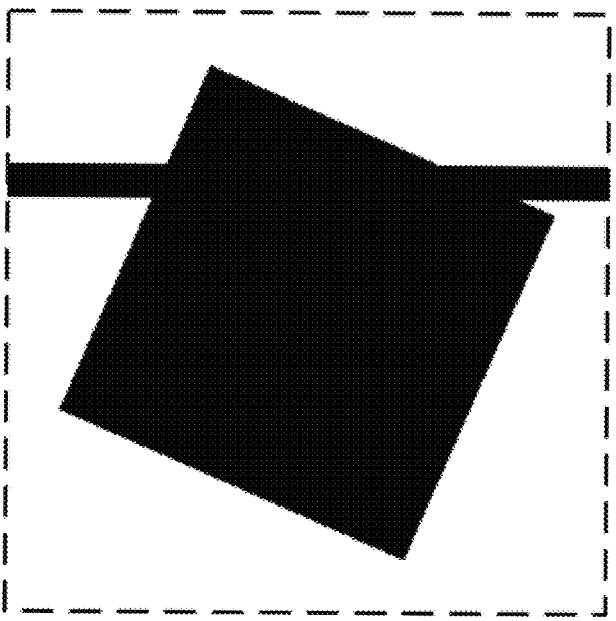

A PIOS with a high EXR based on slab PhC in the present invention, as shown in FIG. 1(a), comprises an upper slab PhC and a lower slab PhC connected as a whole; the upper slab PhC is a first square-lattice slab PhC, the unit cell of the first square-lattice slab PhC includes a high-refractive-index rotating-square pillar, a single first flat dielectric pillar and a background dielectric, the first flat dielectric pillar is arranged horizontally, the first flat dielectric pillar enables the overall upper slab PhC to form as a whole, and the first flat dielectric pillar includes a high-refractive-index dielectric pipe and a low-refractive-index dielectric in the pipe, or a high-refractive-index flat films, or a low-refractive-index dielectric; the low-refractive-index dielectric is vacuum, air, cryolite, silica, organic foam, olive oil or a different dielectric having a refractive index of less than 1.5; as shown in FIG. 1(b), the lower slab PhC is a second square-lattice slab PhC with a complete bandgap, the unit cell of the second square-lattice slab PhC includes a high-refractive-index rotating-square pillar, a single second flat dielectric pillar and a background dielectric, the second flat dielectric pillar is arranged horizontally, the second flat dielectric pillar enables the overall lower PhC slab to form as a whole, the second flat dielectric pillar is a high-refractive-index dielectric pillar, and the high-refractive-index dielectric is silicon, gallium arsenide, titanium dioxide or a different dielectric having a refractive index of more than 2; the background dielectric is a low-refractive-index dielectric. The normalized operating frequency (a/λ) of the PIOS with a high EXR is 0.41 to 0.4167, and this frequency range is either the TE and TM transmission band of the first square-lattice slab PhC and the complete bandgap of the second square-lattice slab PhCs, or the TE and TM transmission band of the second square-lattice slab PhC and the complete bandgap of the first square-lattice slab PhCs, wherein a is a lattice constant of the first and second square-lattice slab PhCs, and λ is the wavelength of incident wave.

A PIOS with a high EXR is realized by adjusting the positions of the first and second square-lattice slab PhCs in an OCH.

For the operating frequency (a/λ) range of the PIOS with a high EXR being 0.41 to 0.4167, the TE polarization EXR reaches −21 dB to −31 dB, the TM polarization EXR reaches −41 dB to −50 dB, the state wherein the first square-lattice slab PhC is located in the OCH and the second square-lattice slab PhC is located outside the OCH is a first switch state of the PIOS with a high EXR, i.e., optically connected state; and the state wherein the second square-lattice slab PhC is located in the OCH and the first square-lattice slab PhC is located outside the OCH is a second switch state of the PIOS with a high EXR, i.e., optically disconnected state.

The EXR of the optical switch is a ratio of the output optical powers of the switch in the two states switching a high EXR based on slab PhCs of the present invention.

The first implementation of the PIOS with a high EXR of the present invention.

Figure 2:
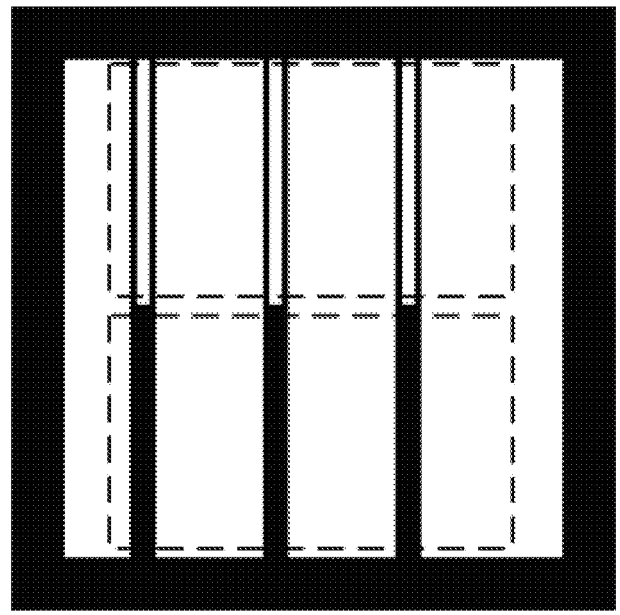
FIG. 2 (a) is a structural schematic diagram of a first implementation of the PIOS of the present invention.
Figure 2:
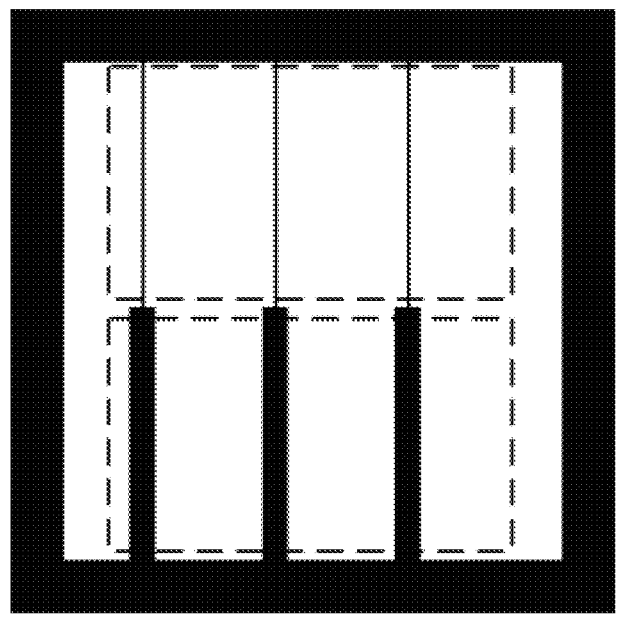
Figure 2:
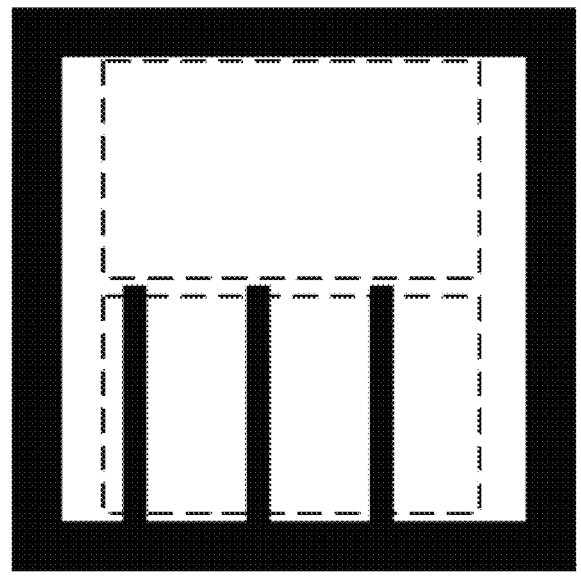

The PIOS includes an upper slab PhC and a lower slab PhC connected into a whole; as shown in FIG. 2(a), rotating-square rods in PhC are omitted in the figure, and the dashed box shows the position of a rotating-square pillar array; the upper slab PhC is a first slab square-lattice slab PhC, the unit cell of the first square-lattice slab PhC includes a high-refractive-index rotating-square pillar, a single first flat dielectric pillar and a background dielectric, the first flat dielectric pillar is arranged horizontally, the first flat dielectric pillar enables the overall upper slab PhC to form as a whole, the first flat dielectric pillar includes a high-refractive-index pipe and a low-refractive-index dielectric in the pipe, the thickness of the pipe wall in the first flat dielectric pillar in the unit cell of the first square-lattice slab PhC is 0 to 0.004a; and the width of the low-refractive-index dielectric in the pipe is the difference between the width of the first flat dielectric pillar and the thickness of the pipe. The lower slab PhC is a second square-lattice slab PhC with a TM bandgap and a complete bandgap, the unit cell of the second square-lattice slab PhC is included of a high-refractive-index rotating-square pillar, a single second slab medium rod and a background dielectric, the second slab dielectric pillar is arranged horizontally, the second flat dielectric pillar enables the overall lower slab PhC to form as a whole, and the first flat dielectric pillar and the second flat dielectric pillar of the first and second square-lattice slab PhCs are respectively spaced 0.2a from the centers of the rotating-square pillars. The side lengths of the high-refractive-index rotating-square pillars of the first and second square-lattice slab PhCs are respectively 0.545a to 0.554a, their rotating angles are 16.01° to 35.04° and 55° to 66.83°, and the widths of the first and second flat dielectric pillars of the first and second square-lattice slab PhCs are respectively 0.075a to 0.082a; the second flat dielectric pillar is a high-refractive-index dielectric pillar, the high-refractive-index dielectric is silicon, gallium arsenide, titanium dioxide or a different dielectric having a refractive index of more than 2, and the high-refractive-index dielectric adopts a silicon material; the background dielectric is a low-refractive-index dielectric, and the low-refractive-index dielectric is vacuum, air, cryolite, silica, organic foam, olive oil or a different dielectric having a refractive index of less than 1.5. The normalized operating frequency (a/λ) of the PIOS with a high EXR is 0.41 to 0.4167, and this normalized operating frequency is either the TE and TM transmission band of the first square-lattice slab PhC and the complete bandgap of the second square-lattice slab PhC, or the TE and TM transmission band of the second square-lattice slab PhC and the complete bandgap of the first square-lattice slab PhC, the TE polarization EXR reaches −21 dB to −31 dB, the TM polarization EXR reaches −41 dB to −50 dB, wherein a is a lattice constant of the first and second square-lattice slab PhCs, and λ is the wavelength of incident wave.

The second implementation of the PIOS with a high EXR of the present invention.

The PIOS includes an upper slab PhC and a lower slab PhC connected as a whole; as shown in FIG. 2(b), the upper slab PhC is a first square-lattice slab PhC and a complete bandgap, the unit cell of the first square-lattice slab PhC includes a high-refractive-index rotating-square pillar, a single first flat dielectric pillar and a background dielectric, the first flat dielectric pillar is arranged horizontally, the first flat dielectric pillar enables the overall upper slab PhC to form as a whole, and the first slab dielectric pillar includes a high-refractive-index flat films; the lower slab PhC is a second square-lattice slab PhC with a complete bandgap, the unit cell of the second square-lattice slab PhC includes a high-refractive-index rotating-square pillar, a single second slab dielectric pillar and a background dielectric, the second flat dielectric pillar is arranged horizontally, the second flat dielectric pillar enables the overall lower slab PhC to form as a whole, the first flat dielectric pillar and the second flat dielectric pillar of the first and second square-lattice slab PhCs are respectively spaced 0.2a from the centers of the rotating-square pillars, the side lengths of the high-refractive-index rotating-square pillars of the first and second square-lattice slab PhCs are respectively 0.5455a to 0.554a, their rotating angles are 22.3° to 23° and 67° to 67.6°, and the widths of the first and second flat dielectric pillars of the first and second square-lattice slab PhCs are respectively 0.076a to 0.079a. The second flat dielectric pillar is a high-refractive-index dielectric pillar, the high-refractive-index dielectric is silicon, gallium arsenide, titanium dioxide or a different dielectric having a refractive index of more than 2, and the high-refractive-index dielectric adopts a silicon material; the background dielectric is a low-refractive-index dielectric and the low-refractive-index dielectric is vacuum, air, cryolite, silica, organic foam, olive oil or a different dielectric having a refractive index of less than 1.5. The normalized operating frequency (a/λ) of the PIOS with a high EXR is 0.41 to 0.4167, and this normalized operating frequency is either the TE and TM transmission band of the first square-lattice slab PhC and the complete bandgap of the second square-lattice slab PhC, or the TE and TM transmission band of the second square-lattice slab PhC and the complete bandgap of the first square-lattice slab PhC, the TE polarization EXR reaches −21 dB to −31 dB, the TM polarization EXR reaches −41 dB to −50 dB, wherein a is a lattice constant of the first and second square-lattice slab PhCs, and λ is the wavelength of incident wave.

The third implementation of the PIOS with a high EXR of the present invention.

The PIOS includes an upper slab PhC and a lower slab PhC connected as a whole; as shown in FIG. 2(c), The upper slab PhC is a first square-lattice slab PhC, the unit cell of the first square-lattice slab PhC includes a high-refractive-index rotating-square pillar, a single first flat dielectric pillar and a background dielectric, the first flat dielectric pillar includes a low-refractive-index dielectric, the background dielectric is a low-refractive-index dielectric, a slot is formed in the high-refractive-index rotating-square pillar and is filled with the low-refractive-index dielectric, and the low-refractive-index dielectric is vacuum, air, cryolite, silica, organic foam, olive oil or a different dielectric having a refractive index of less than 1.5, e.g., the slot is filled with air. The lower slab PhC is a second square-lattice slab PhC with a complete bandgap, the unit cell of the second square-lattice slab PhC is included of a high-refractive-index rotating-square pillar a single second flat dielectric pillar and a background dielectric, the second flat dielectric pillar is arranged horizontally, the second flat dielectric pillar enables the overall lower slab PhC to form as a whole, the first flat dielectric pillar and the second flat dielectric pillar of the first and second square-lattice slab PhCs are respectively spaced 0.2a from the centers of the rotating-square pillars, the side lengths of the high-refractive-index rotating-square pillars of the first and second square-lattice slab PhCs are respectively 0.5455a to 0.554a, and their rotating angles are 22.3° to 23° and 67° to 67.6°; the widths of the first and second flat dielectric pillars of the first and second square-lattice slab PhCs are respectively 0.076a to 0.079a; the second flat dielectric pillar is a high-refractive-index dielectric pillar, the high-refractive-index dielectric is silicon, gallium arsenide, titanium dioxide or a different dielectric having a refractive index of more than 2, and the high-refractive-index dielectric adopts a silicon material; the background dielectric is a low-refractive-index dielectric; the normalized operating frequency (a/λ) of the PIOS with a high EXR is 0.41 to 0.4167, and this normalized operating frequency is either the TE band and TM transmission band of the first square-lattice slab PhC and the complete bandgap of the second square-lattice slab PhC, or the TE band and TM transmission band of the second square-lattice slab PhC and the complete bandgap of the first square-lattice slab PhC, the TE polarization EXR reaches −21 dB to −31 dB, the TM polarization EXR reaches −41 dB to −50 dB, wherein a is a lattice constant of the first and second square-lattice slab PhCs, and λ is the wavelength of incident wave.

The afore said three implementations all take a paper surface as the reference plane, and the upper and lower slab PhCs are connected as a whole by a frame and move vertically under the action of external forces to realize the functions of the optical switch, as shown in FIGS. 2(a), 2(b), and 2(c). The rotating-square dielectric pillars in PhC are omitted in the figure, and the dashed box shows the position of a rotating-square pillar array. Because the frame itself is not on the light input and output planes, i.e., the light input and output planes are parallel to the reference plane, the propagation of light is not influenced. The vertical movement of the upper and lower slab PhCs serving as a whole can be realized by micromechanical force, electric or magnetic forces. For example, a magnet may be embedded into the frame, a pressure linkage device is connected with the frame, the pressure can thus drive the black frame to move up and down, and the left and right sides of the frame are located in a groove guide rail to guarantee that the black frame moves vertically, linearly and reciprocally.

Embodiment 1

Figure 3:
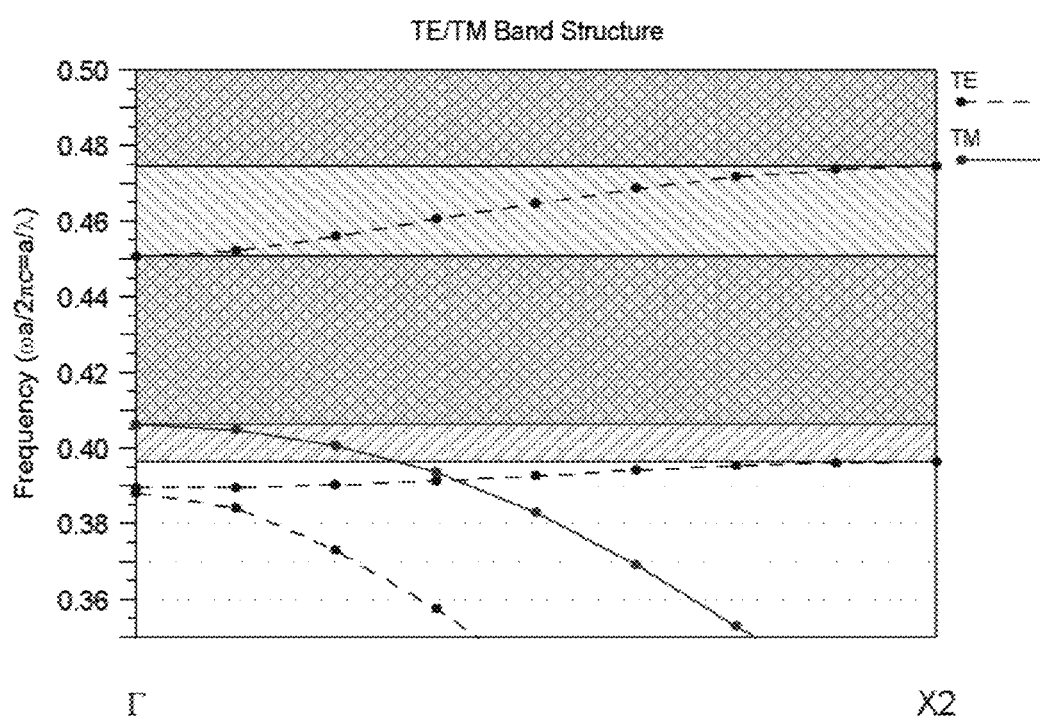
FIG. 3 is a photonic band map of the second square-lattice slab PhC shown in embodiment 1.
Figure 4:
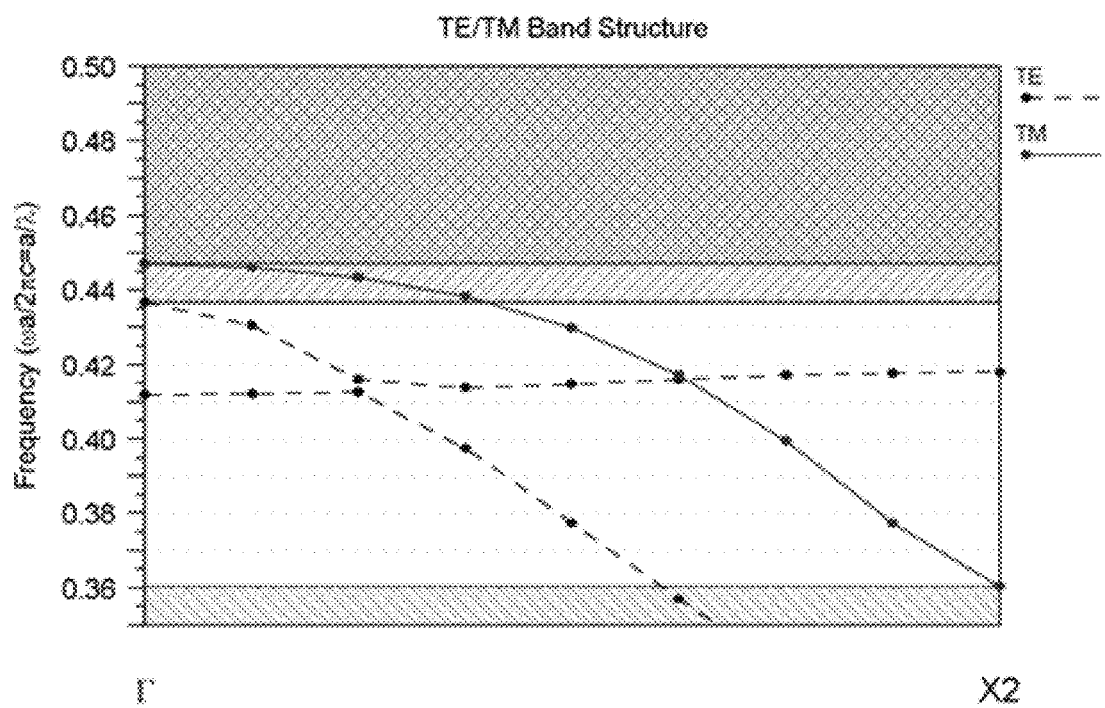
FIG. 4 is a photonic band map of the first square-lattice slab PhC shown in embodiment 1.

In this embodiment, different photonic band maps in a vertical direction are obtained through the first and second square-lattice slab PhCs, FIG. 3 is a photonic band map of the second square-lattice slab PhC, FIG. 4 is photonic band map of the first square-lattice slab PhC, and it can be known by comparison that for the normalized operating frequency (a/λ) range of 0.4063 to 0.4366, this structure enables a PIOS with a high EXR.

Embodiment 2

Figure 5:
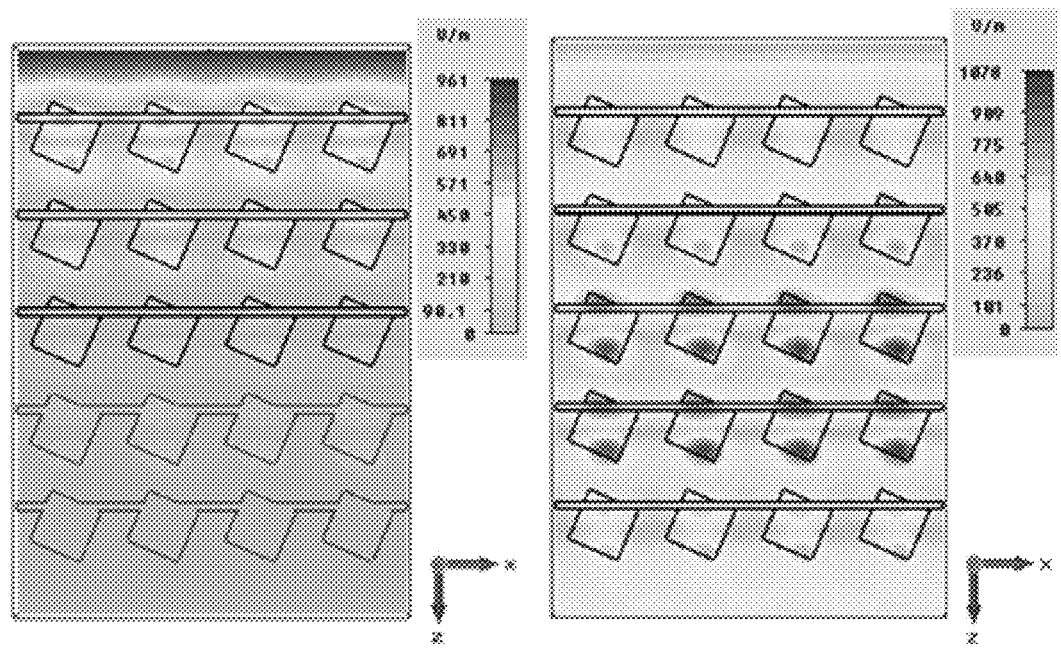
FIG. 5 (a) is a TE field distribution diagram in the PIOS for the normalized frequency of 0.41 as shown in embodiment 2.
Figure 5:
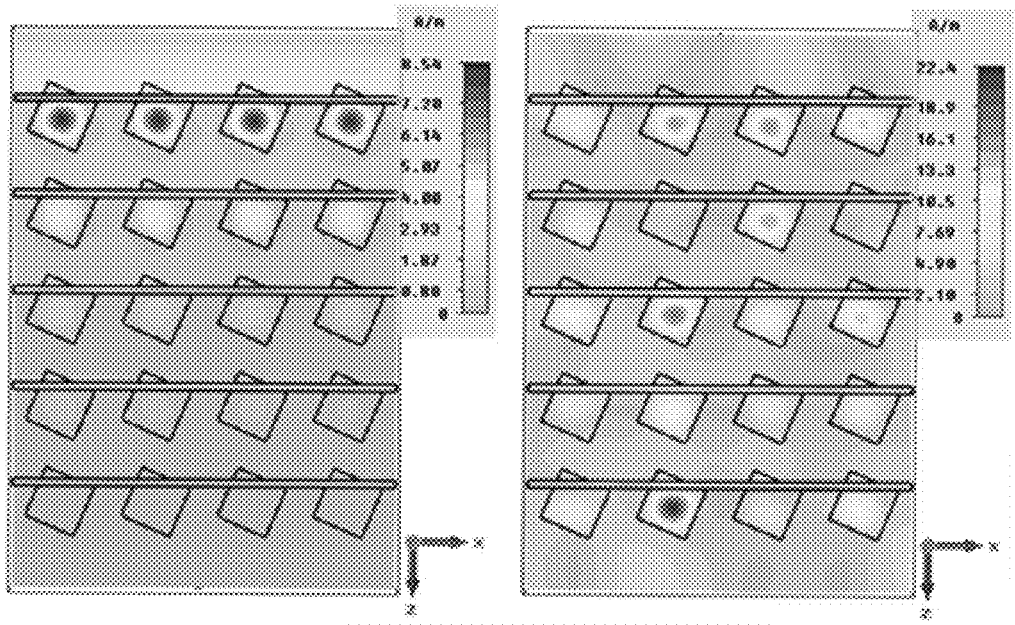

In this embodiment, the normalized photonic operating frequency (a/λ) is 0.41. By adopting the first implementation and verifying with three-dimensional (3D) structure parameters for five layers of high-refractive-index rotating dielectric pillars and five layers of high-refractive-index dielectric veins consisting of rotating pillars and connecting plates, the result is illustrated in FIGS. 5(a) and 5(b). It can be known from FIGS. 5(a) and 5(b) that: the switch has good extinction effect.

Embodiment 3

Figure 6:
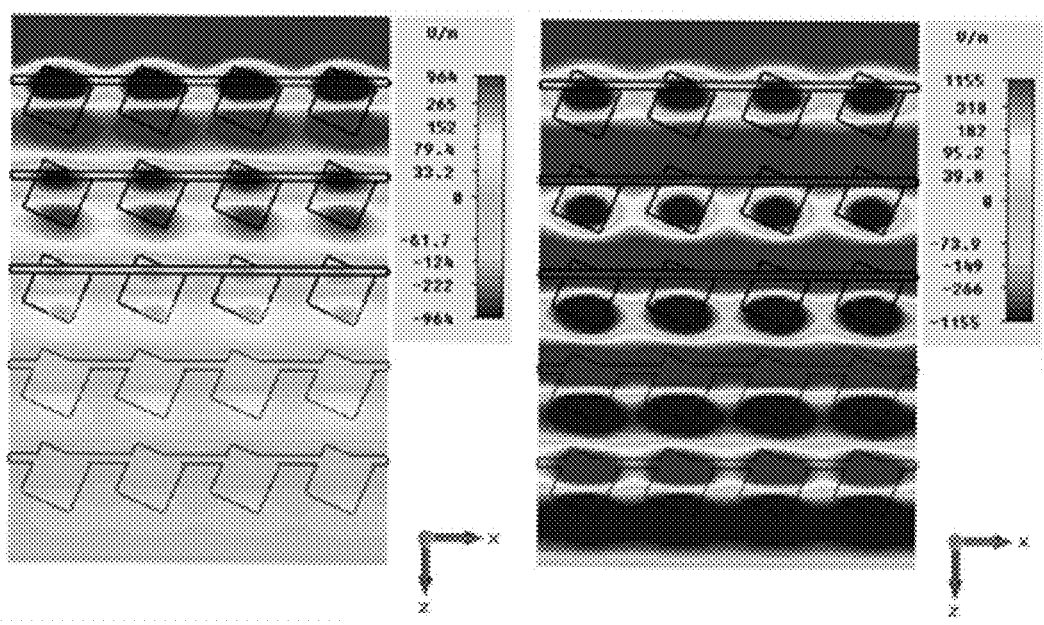
FIG. 6 (a) is a TE field distribution diagram in the PIOS for the normalized operating frequency of 0.4117 as shown in embodiment 3.
Figure 6:
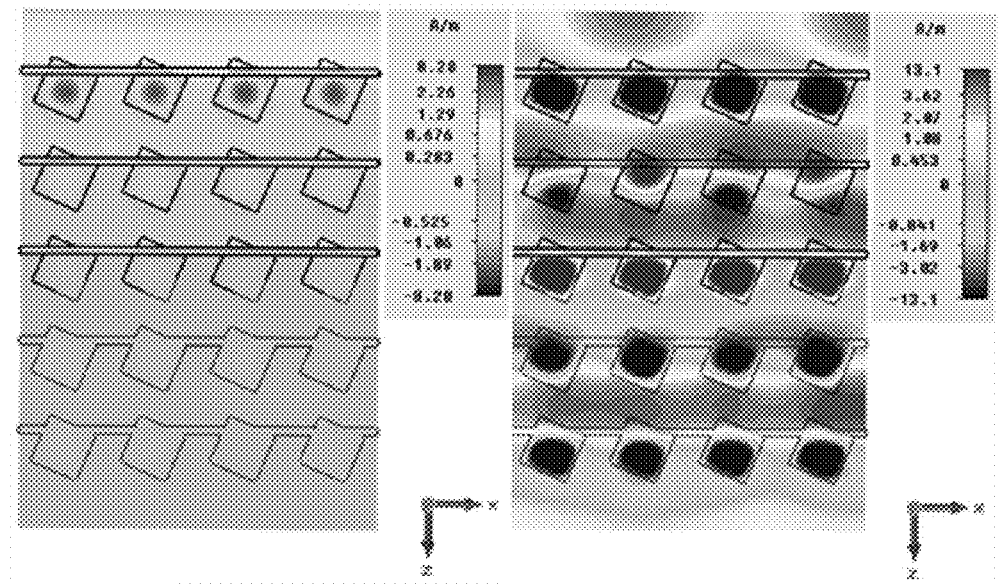

In this embodiment, the normalized photonic operating frequency (a/λ) is 0.4117. By adopting the first implementation and verifying with 3D structure parameters for five layers of high-refractive-index rotating dielectric pillars and five layers of high-refractive-index dielectric veins consisting of rotating dielectric pillars and connecting plates, the result is illustrated in FIGS. 6(a) and 6(b). It can be known from FIGS. 6(a) and 6(b) that: the switch has good extinction effect.

Embodiment 4

Figure 7:
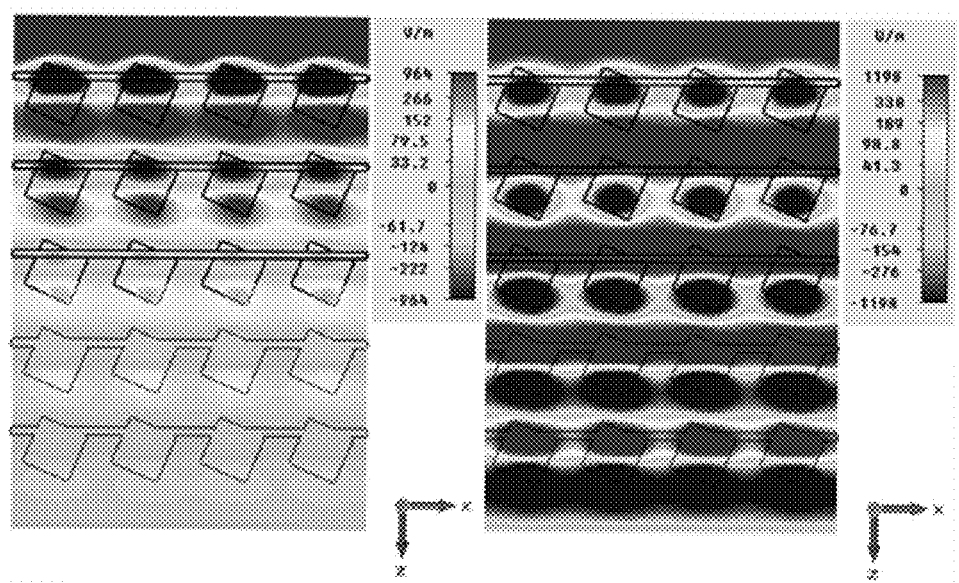
FIG. 7 (a) is a TE field distribution diagram in the PIOS for the normalized operating frequency of 0.4121 as shown in embodiment 4.
Figure 7:
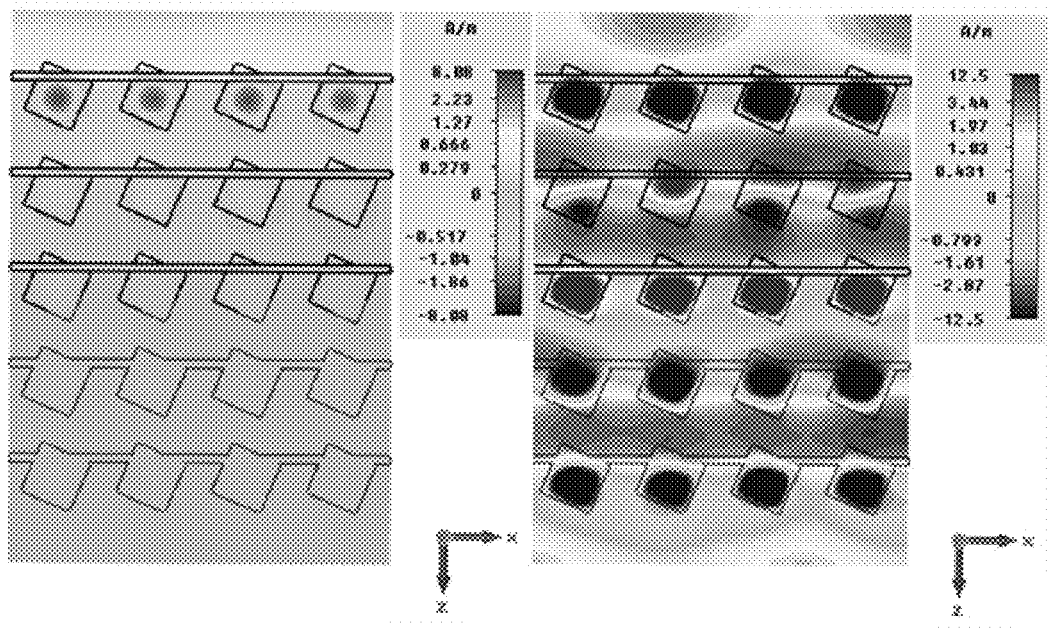

In this embodiment, the normalized photonic operating frequency (a/λ) is 0.4121. By adopting the first implementation and verifying with 3D structure parameters for five layers of high-refractive-index rotating dielectric pillars and five layers of high-refractive-index dielectric veins consisting of rotating pillars and connecting plates are included, the result is illustrated in FIGS. 7(a) and 7(b). It can be known from FIGS. 7(a) and 7(b) that: the switch has good extinction effect.

Embodiment 5

Figure 8:
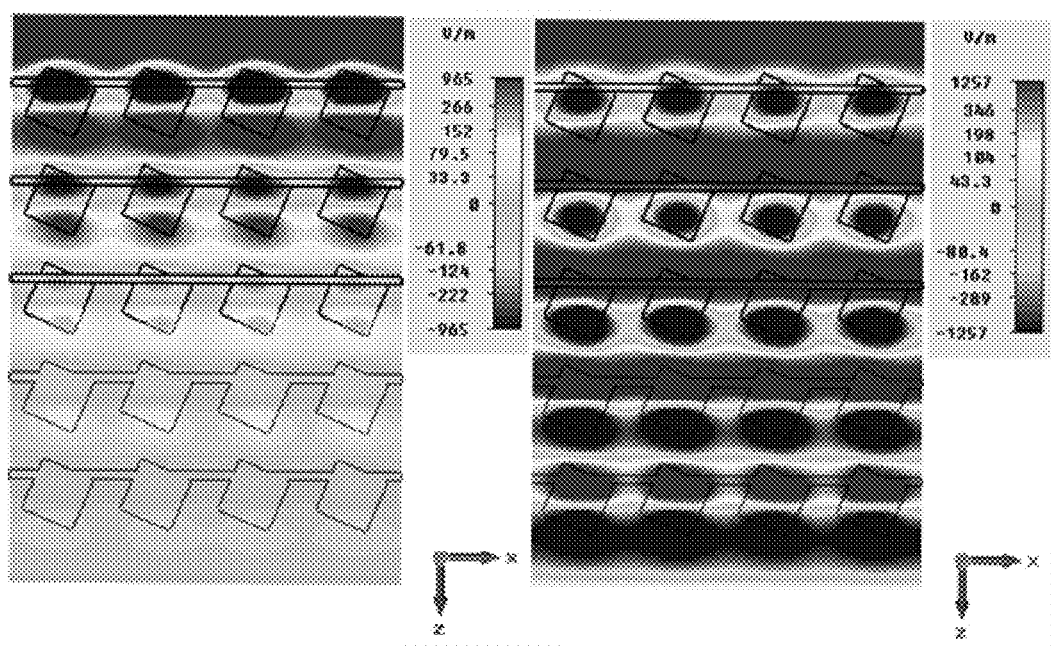
FIG. 8 (a) is a TE field distribution diagram in the PIOS for the normalized operating frequency of 0.4127 as shown in embodiment 5.
Figure 8:
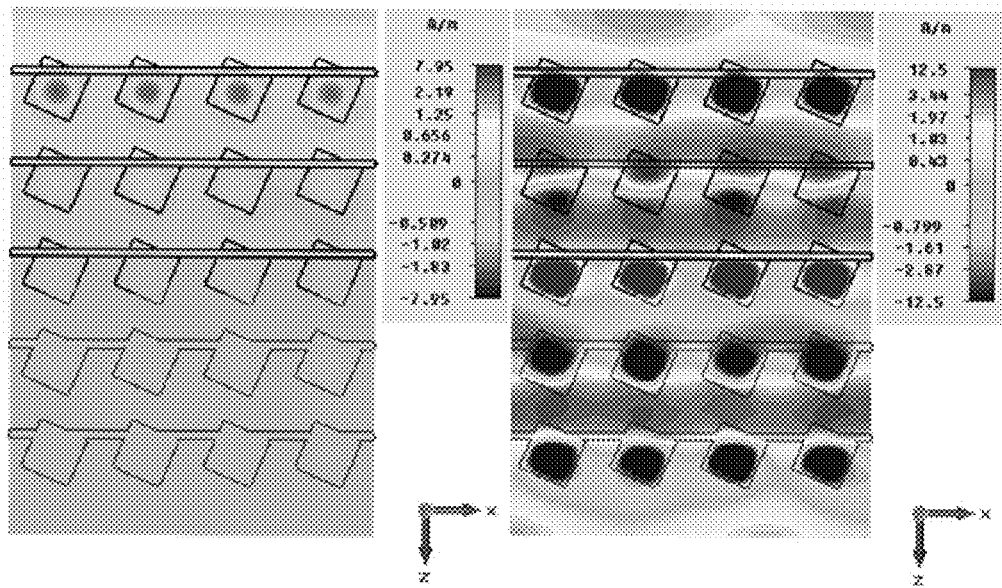

In this embodiment, the normalized photonic operating frequency (a/λ) is 0.4127. By adopting the second implementation and verifying with 3D structure parameters for five layers of high-refractive-index rotating dielectric pillars and five layers of high-refractive-index dielectric veins consisting of rotating pillars and connecting plates, the result is illustrated in FIGS. 8(a) and 8(b). It can be known from FIGS. 8(a) and 8(b) that: the switch has good extinction effect.

Embodiment 6

Figure 9:
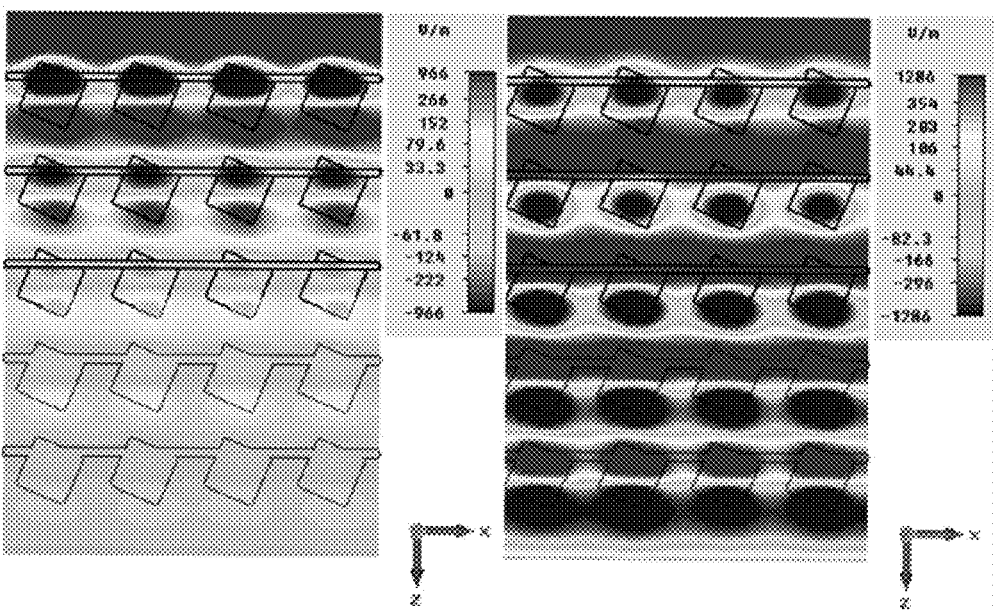
FIG. 9 (a) is a TE field distribution diagram in the PIOS for the normalized operating frequency of 0.413 as shown in embodiment 6.
Figure 9:
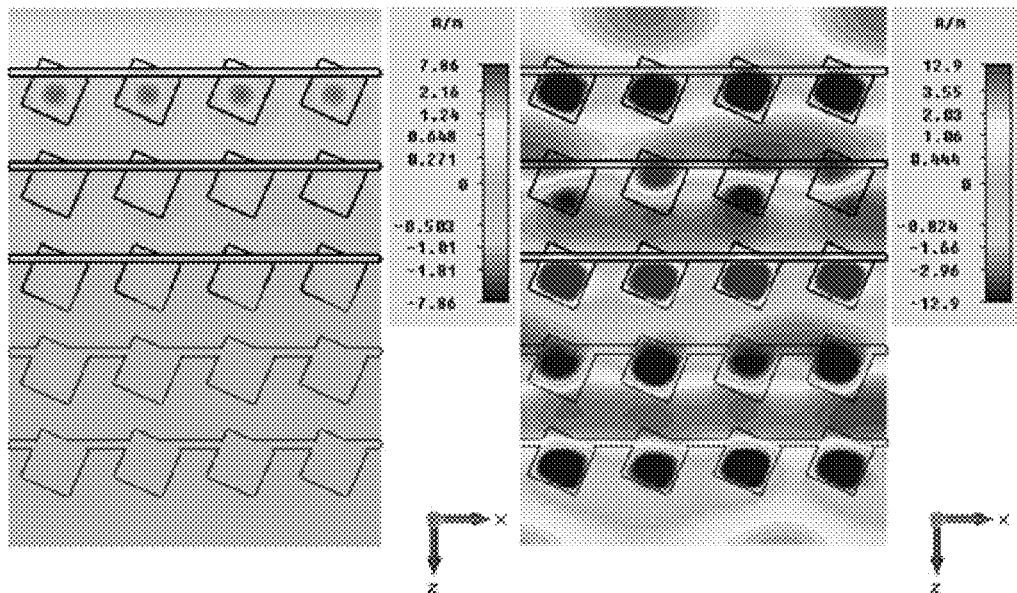

In this embodiment, the normalized photonic operating frequency (a/λ) is 0.413. By adopting the second implementation and verifying with 3D structure parameters for five layers of high-refractive-index rotating dielectric pillars and five layers of high-refractive-index dielectric veins consisting of rotating pillars and connecting plates, the result is illustrated in FIGS. 9(a) and 9(b). It can be known from FIGS. 9(a) and 9(b) that: the switch has good extinction effect.

Embodiment 7

Figure 10:
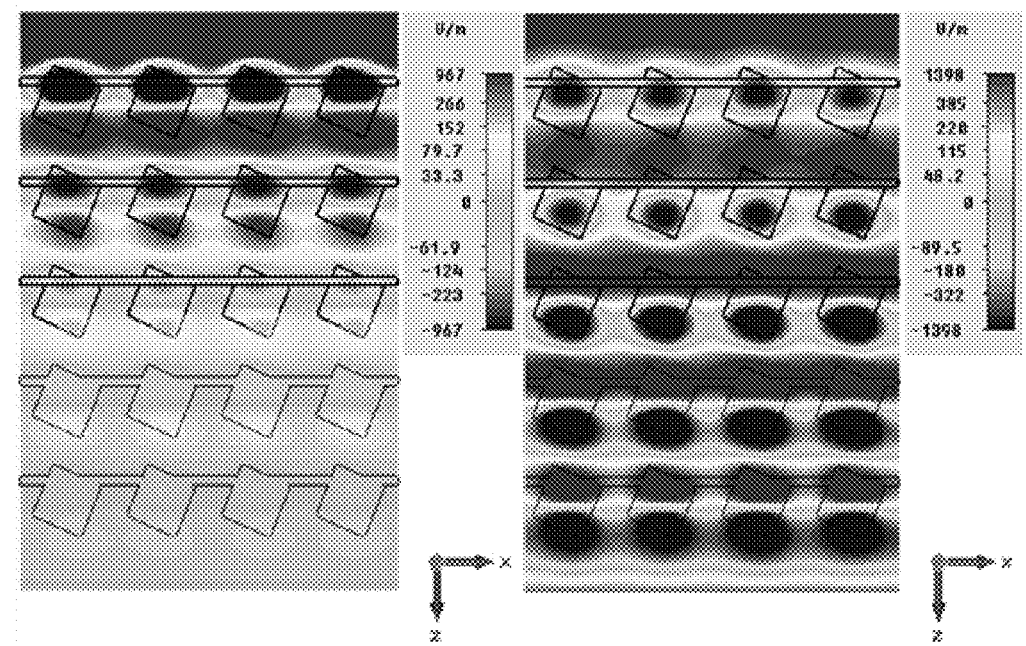
FIG. 10 (a) is a TE field distribution diagram in the PIOS for the normalized operating frequency of 0.4142 as shown in embodiment 7.
Figure 10:
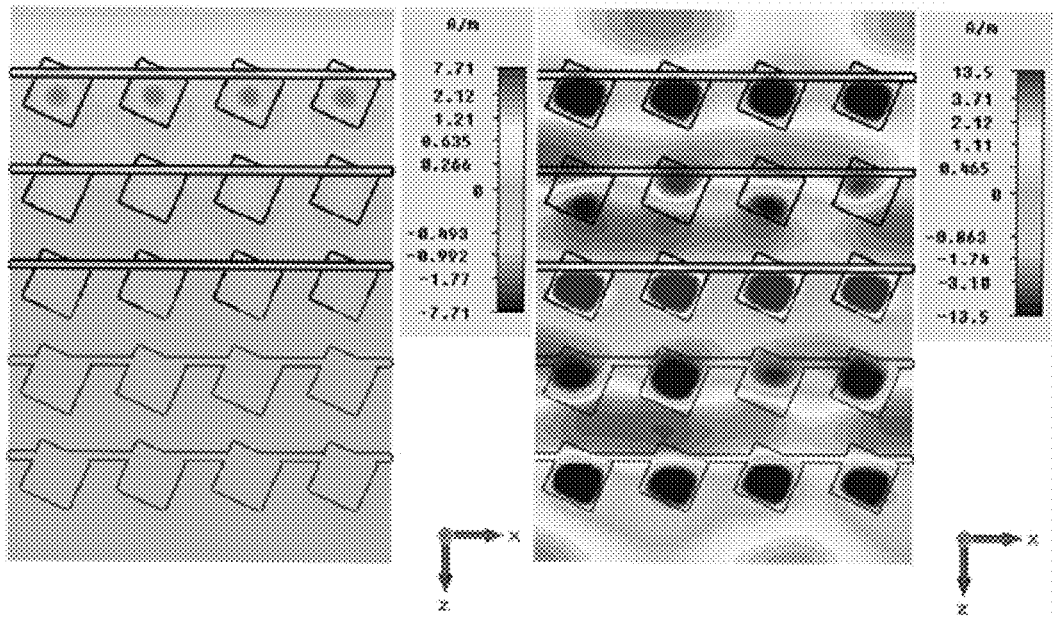

In this embodiment, the normalized photonic operating frequency (a/λ) is 0.4142. By adopting the third implementation and verifying with 3D structure parameters for five layers of high-refractive-index rotating dielectric pillars and five layers of high-refractive-index dielectric veins consisting of rotating pillars and connecting plates, the result is illustrated in FIGS. 10(a) and 10(b). It can be known from FIGS. 10(a) and 10(b) that: the switch has good extinction effect.

Embodiment 8

Figure 11:
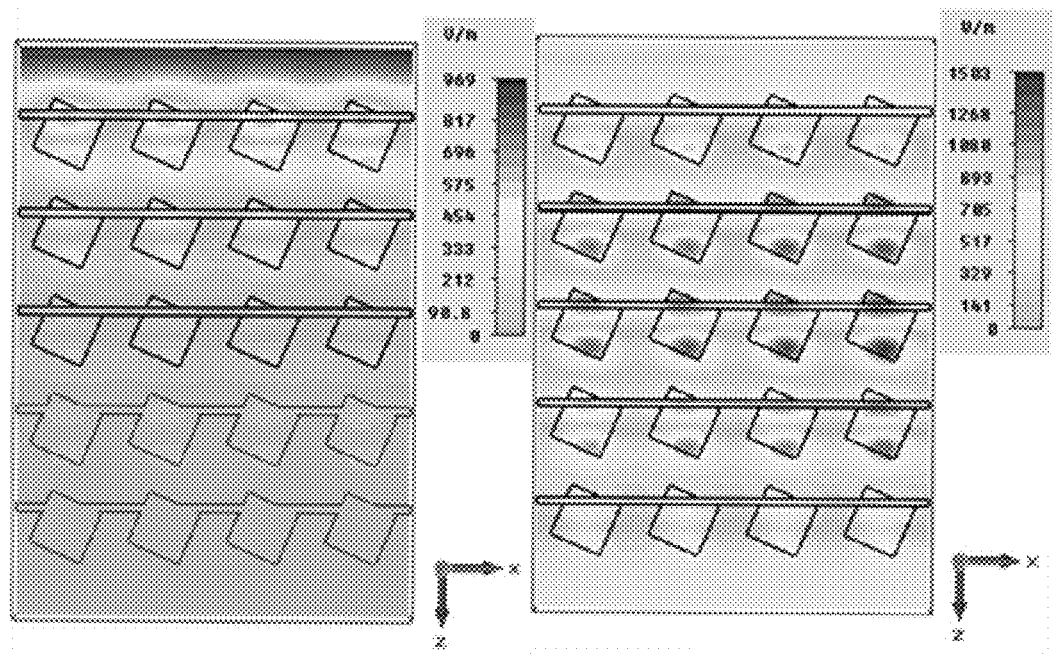
FIG. 11 (a) is a TE field distribution diagram in the PIOS for the normalized operating frequency of 0.4167 as shown in embodiment 8.
Figure 11:
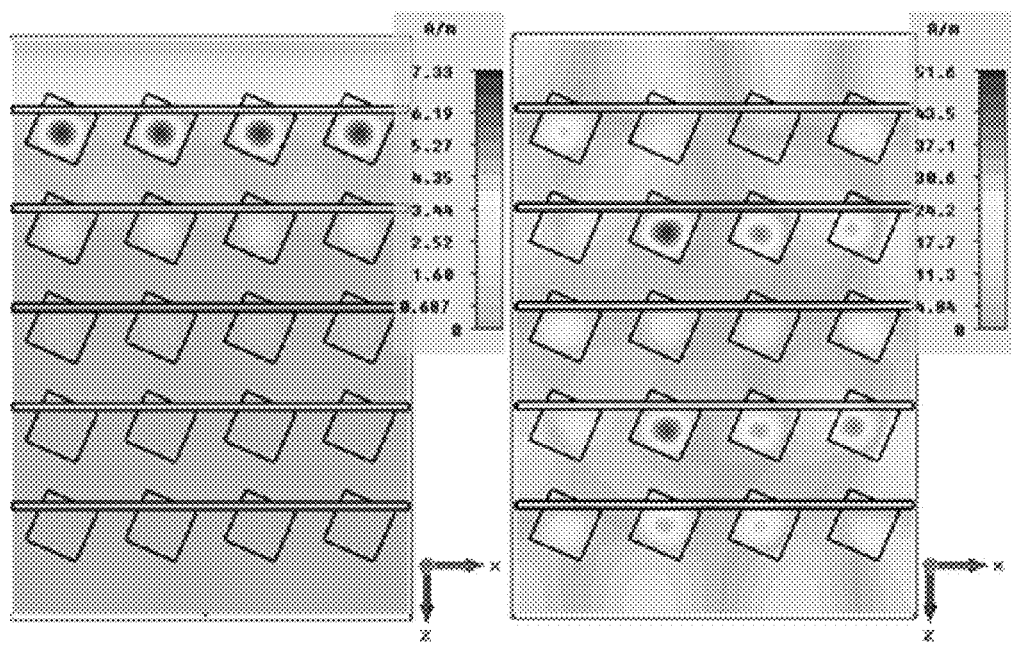

In this embodiment, the normalized photonic operating frequency (a/λ) is 0.4167. By adopting the third implementation and verifying with 3D structure parameters for five layers of high-refractive-index rotating dielectric pillars and five layers of high-refractive-index dielectric veins consisting of rotating pillars and connecting plates, the result is illustrated in FIGS. 11(*a*) and 11(*b*). It can be known from FIGS. 11(*a*) and 11(*b*) that: the switch has good extinction effect.

While the invention has been described in terms of various specific embodiments, those skilled in the art will recognize that the invention can be practiced with modification within the spirit and scope of the claims.

What claimed is:

1. A PIOS with a high EXR based on slab PhCs, wherein said PIOS with a high EXR based on slab PhCs comprising:
an upper slab PhC and a lower slab PhC connected as a whole; said upper slab PhC is a first square-lattice slab PhC, the unit cell of said first square-lattice slab PhC includes a high-refractive-index rotating-square pillar, a single first flat dielectric pillar and a background dielectric; said first flat dielectric pillar is arranged horizontally, said first flat dielectric pillar enables an overall upper slab PhC to form as a whole, and said first flat dielectric pillar includes a high-refractive-index dielectric pipe and a low-refractive-index dielectric, or a high-refractive-index flat films, or a low-refractive-index dielectric; said lower slab PhC is a second square-lattice slab PhC with a complete bandgap, the unit cell of said second square-lattice slab PhC includes a high-refractive-index rotating-square pillar, a single second flat dielectric pillar and a background dielectric, said second flat dielectric pillar is arranged horizontally, said second flat dielectric pillar enables an overall lower slab PhC to form as a whole, and said second flat dielectric pillar is a high-refractive-index dielectric pillar; said background dielectric is a low-refractive-index dielectric; and a normalized frequency of said PIOS is 0.41 to 0.4167.

2. The PIOS with a high EXR based on slab PhCs in accordance with claim 1, wherein the thickness of the pipe wall in the first dielectric pillar in the unit cell of said first square-lattice slab PhC is 0-0.004a, where a is the lattice constant of the PhC; and the width of said low-refractive-index dielectric in the pipe is the difference between the width of said first flat dielectric pillar and the thickness of the pipe.

3. The PIOS with a high EXR based on slab PhCs in accordance with claim 1, wherein said first and second flat dielectric pillars of said first and second square-lattice slab PhCs are respectively spaced 0.2a of the centers of the rotating-square pillars.

4. The PIOS with a high EXR based on slab PhCs in accordance with claim 1, wherein the side lengths of said high-refractive-index rotating-square pillars of said first and second square-lattice slab PhCs are respectively 0.545a to 0.554a, and their rotating angles are 22.3° to 23° and 67° to 67.6°; and the widths of said first and second slab dielectric pillars of said first and second square-lattice slab PhCs are respectively 0.076a to 0.079a.

5. The PIOS with a high EXR based on slab PhCs in accordance with claim 1, wherein said high-refractive-index dielectric is silicon, gallium arsenide, titanium dioxide or a different dielectric having a refractive index of more than 2.

6. The PIOS with a high EXR based on slab PhCs in accordance with claim 1, wherein said low-refractive-index dielectric is vacuum, air, cryolite, silica, organic foam, olive oil or a different dielectric having a refractive index of less than 1.5.

7. The PIOS with a high EXR based on slab PhCs in accordance with claim 1, wherein said PIOS has one state that said first square-lattice slab PhC is located in an OCH and said second square-lattice slab PhC is located outside an OCH, and another state that said second square-lattice slab PhC is located in the OCH and said first square-lattice slab PhC is located outside the OCH.

8. The PIOS with a high EXR based on slab PhCs in accordance with claim 7, wherein said state that said first square-lattice slab PhC is located in the OCH and said second square-lattice slab PhC is located outside the OCH is the optically connected state; the state, wherein said second square-lattice slab PhC is located in the OCH and said first square-lattice slab PhC is located outside the OCH is the optically disconnected state.

9. The PIOS with a high EXR based on slab PhCs in accordance with claim 1, wherein said normalized operating frequency range of said PIOS is 0.41 to 0.4167, a TE polarization EXR is −21 dB to −31 dB, and a TM polarization EXR is −41 dB to −50 dB.

10. The PIOS with a high EXR based on slab PhCs in accordance with claim 1, wherein positions of said first and the second square-lattice slab PhCs in the OCHs are adjusted by external forces, including mechanical, electrical and magnetic forces.

\* \* \* \* \*